US011402975B2

(12) United States Patent
Park et al.

(10) Patent No.: US 11,402,975 B2
(45) Date of Patent: Aug. 2, 2022

(54) APPARATUS AND METHOD FOR PROVIDING INTERACTIVE CONTENT

(71) Applicant: ILLUNI INC., Seoul (KR)

(72) Inventors: Byunghwa Park, Seoul (KR); Kibong Kim, Seoul (KR); Gabee Jo, Gyeonggi-do (KR); Youngjun Kwon, Seoul (KR); Jongbum Lee, Gyeonggi-do (KR); Kunsang Jung, Seoul (KR)

(73) Assignee: ILLUNI INC., Seoul (KR)

( * ) Notice: Subject to any disclaimer, the term of this patent is extended or adjusted under 35 U.S.C. 154(b) by 0 days.

(21) Appl. No.: 17/116,040

(22) Filed: Dec. 9, 2020

(65) Prior Publication Data

US 2021/0357088 A1 Nov. 18, 2021

(30) Foreign Application Priority Data

May 18, 2020 (KR) ........................ 10-2020-0059105

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 3/167* (2013.01); *G06T 13/40* (2013.01); *G06T 2200/24* (2013.01)

(58) Field of Classification Search
CPC ...... G06F 3/0484; G06F 3/0482; G06F 3/167; G06T 13/40
See application file for complete search history.

(56) References Cited

U.S. PATENT DOCUMENTS 10,169,897 B1 * 1/2019 Geiger .................... A63F 13/60
10,551,993 B1 * 2/2020 Sanocki ................. G06F 3/017
(Continued)

FOREIGN PATENT DOCUMENTS

JP 08263681 A 10/1996
JP 09198522 A 7/1997
(Continued)

OTHER PUBLICATIONS

Office Action issued in corresponding JP Application No. 2020-204006, dated Feb. 18, 2022, 6 pages.

*Primary Examiner* — Daeho D Song
(74) *Attorney, Agent, or Firm* — Burris Law, PLLC

(57) ABSTRACT

An apparatus providing interactive content includes an input interface configured to sense an input of a user, a display configured to output a video, at least one memory configured to store instructions for performing a certain operation, and at least one processor operably connected to the at least one memory and configured to execute the instructions. The processor provides, when a plurality of animation units including object information for specifying an object to be output in the video and driving information for defining motion of the object are played, interactive content played by the object moving according to the driving information to a user, receives information of the user to be reflected in the interactive content, inserts the information of the user to a part of the object information, and plays at least one of the plurality of animation units to play the interactive content.

23 Claims, 13 Drawing Sheets

INPUT CHARACTER FACE
OBJECT INFORMATION
DRIVING INFORMATION
INPUT IMAGE
STANDARDIZE
THREE-DIMENSIONAL MODEL

(51) Int. Cl.

| | |
|---|---|
| ***G06T 13/40*** | (2011.01) |
| ***G06F 3/16*** | (2006.01) |

(56) References Cited

U.S. PATENT DOCUMENTS

| | | | | |
|---|---|---|---|---|
| 10,552,667 | B1 * | 2/2020 | Bogan, III | G06K 9/6272 |
| 10,755,463 | B1 * | 8/2020 | Albuz | G10L 13/00 |
| 11,199,957 | B1 * | 12/2021 | Alvi | H04L 51/32 |
| 2008/0158230 | A1 * | 7/2008 | Sharma | G06T 13/40 345/473 |
| 2010/0328492 | A1 * | 12/2010 | Fedorovskaya | G06V 10/462 348/231.2 |
| 2012/0026174 | A1 * | 2/2012 | McKeon | G06T 13/40 345/473 |
| 2012/0223952 | A1 * | 9/2012 | Kanemaru | G06T 13/40 345/473 |
| 2014/0035929 | A1 * | 2/2014 | Matthews | G06T 17/20 345/473 |
| 2014/0361974 | A1 * | 12/2014 | Li | G06F 3/0304 345/156 |
| 2016/0234149 | A1 * | 8/2016 | Tsuda | H04L 51/16 |
| 2016/0328628 | A1 * | 11/2016 | Bhat | G06T 7/60 |
| 2017/0221253 | A1 * | 8/2017 | Banerjee | G06T 11/001 |
| 2018/0047200 | A1 * | 2/2018 | O'Hara | G06T 11/60 |
| 2018/0188905 | A1 * | 7/2018 | Tran | G06F 3/0346 |
| 2018/0276185 | A1 * | 9/2018 | Kaldma | G06T 11/60 |
| 2019/0171338 | A1 * | 6/2019 | Voss | G06T 13/40 |
| 2019/0266807 | A1 * | 8/2019 | Lee | G06T 11/001 |
| 2019/0272083 | A1 * | 9/2019 | Grandpre | G06F 16/4393 |
| 2020/0142572 | A1 * | 5/2020 | Liu | G06F 3/04847 |
| 2020/0226844 | A1 * | 7/2020 | Chiu | G06F 3/011 |
| 2020/0286301 | A1 * | 9/2020 | Loper | G06T 7/80 |
| 2021/0243482 | A1 * | 8/2021 | Baril | H04L 67/38 |

FOREIGN PATENT DOCUMENTS

| | | | |
|---|---|---|---|
| JP | 2000322590 | A | 11/2000 |
| JP | 2001292305 | A | 10/2001 |
| JP | 2004071013 | A | 3/2004 |
| JP | 2004072776 | A | 3/2004 |
| JP | 3124018 | U | 8/2006 |
| JP | 2008217447 | A | 9/2008 |
| JP | 2008304999 | A | 12/2008 |
| JP | 2011170891 | A | 9/2011 |
| KR | 10-2013-0093186 | | 8/2013 |
| KR | 10-1728099 | | 4/2017 |
| KR | 10-1902553 | | 9/2018 |
| WO | 2003038759 | A | 5/2003 |

* cited by examiner

*FIG. 4*

File Text Save

Tale Version None

| Type | EventName | Time | Position |
|---|---|---|---|
| 3 | NEXT_ANI | 10.21735 | (-1.5315, -0.9058, 0.0000) |
| 2 | TOUCH | 13.27008 | (-0.3759, -0.2111, 0.0000) |
| 3 | NEXT_ANI | 17.8402 | (0.0556, -0.7370, 0.0000) |
| 2 | TOUCH | 21.52873 | (0.4519, -0.4130, 0.0000) |
| 3 | NEXT_ANI | 26.04724 | (0.4648, -0.4370, 0.0000) |
| 2 | TOUCH | 30.18378 | (0.0630, -0.6944, 0.0000) |
| 3 | NEXT_ANI | 33.3031 | (0.3130, -0.3500, 0.0000) |
| 2 | TOUCH | 36.58972 | (0.1333, 0.5056, 0.0000) |
| 3 | NEXT_ANI | 42.37744 | (0.6241, -0.7241, 0.0000) |
| 3 | NEXT_ANI | 47.08191 | (0.6241, -0.7241, 0.0000) |
| 3 | NEXT_ANI | 55.75657 | (0.6241, -0.7241, 0.0000) |
| 3 | NEXT_ANI | 65.14624 | (0.6241, -0.7241, 0.0000) |
| 3 | NEXT_ANI | 71.81865 | (0.6241, -0.7241, 0.0000) |
| 3 | NEXT_ANI | 79.4082 | (0.6241, -0.7241, 0.0000) |
| 2 | TOUCH | 81.59314 | (0.7796, -0.3704, 0.0000) |
| 0 | NEXT_SCENE | 87.01465 | (1.4648, -1.0426, 0.0000) |
| 3 | NEXT_ANI | 94.06238 | (1.4648, -1.0426, 0.0000) |
| 3 | NEXT_ANI | 107.8573 | (1.4648, -1.0426, 0.0000) |
| 3 | NEXT_ANI | 119.4008 | (1.4648, -1.0426, 0.0000) |
| 2 | TOUCH | 126.4561 | (-0.1019, -0.4981, 0.0000) |
| 3 | NEXT_ANI | 128.2408 | (-0.1000, -0.5019, 0.0000) |
| 3 | NEXT_ANI | 134.5463 | (-0.1000, -0.5019, 0.0000) |
| 2 | TOUCH | 140.1339 | (1.6481, -0.7037, 0.0000) |
| 3 | NEXT_ANI | 141.4017 | (1.5833, -0.7111, 0.0000) |
| 3 | NEXT_ANI | 148.6365 | (1.5833, -0.7111, 0.0000) |
| 2 | TOUCH | 150.7261 | (0.3333, -0.6944, 0.0000) |
| 3 | NEXT_ANI | 153.2109 | (0.3333, -0.6944, 0.0000) |
| 0 | NEXT_SCENE | 162.0691 | (0.3333, -0.6944, 0.0000) |
| 3 | NEXT_ANI | 171.5713 | (0.3500, 0.3926, 0.0000) |
| 2 | TOUCH | 172.8669 | (1.1056, 0.6204, 0.0000) |
| 3 | NEXT_ANI | 190.5867 | (1.1815, 0.5093, 0.0000) |
| 3 | NEXT_ANI | 196.5063 | (1.1815, 0.5093, 0.0000) |
| 0 | NEXT_SCENE | 208.3995 | (1.1815, 0.5093, 0.0000) |
| 3 | NEXT_ANI | 219.5654 | (1.1815, 0.5093, 0.0000) |
| 2 | TOUCH | 227.5587 | (-0.2759, -0.3667, 0.0000) |
| 2 | TOUCH | 228.743 | (0.0111, -0.4296, 0.0000) |
| 2 | TOUCH | 230.1273 | (0.2500, -0.7537, 0.0000) |
| 3 | NEXT_ANI | 232.0293 | (0.2519, -0.7556, 0.0000) |
| 3 | NEXT_ANI | 235.332 | (0.2519, -0.7556, 0.0000) |
| 3 | NEXT_ANI | 244.9232 | (0.2519, -0.7556, 0.0000) |
| 3 | NEXT_ANI | 253.797 | (0.2519, -0.7556, 0.0000) |
| 3 | NEXT_ANI | 258.7178 | (0.2519, -0.7556, 0.0000) |
| 3 | NEXT_ANI | 262.9045 | (0.2519, -0.7556, 0.0000) |
| 3 | NEXT_ANI | 268.2924 | (0.2519, -0.7556, 0.0000) |
| 2 | TOUCH | 283.2881 | (0.7685, -0.0722, 0.0000) |
| 0 | NEXT_SCENE | 286.2406 | (0.7685, -0.0741, 0.0000) |
| 2 | TOUCH | 290.0092 | (-0.7167, 0.6019, 0.0000) |
| 3 | NEXT_ANI | 300.1675 | (-0.0167, 0.1519, 0.0000) |
| 3 | NEXT_ANI | 308.7063 | (-0.0167, 0.1519, 0.0000) |
| 2 | TOUCH | 311.0765 | (-0.6019, 0.0648, 0.0000) |
| 3 | NEXT_ANI | 320.7179 | (-0.3722, -0.1315, 0.0000) |

*FIG.5B*

APPARATUS AND METHOD FOR PROVIDING INTERACTIVE CONTENT

CROSS-REFERENCE TO RELATED APPLICATION AND PRIORITY

This application claims priority to and the benefit of Korean Patent Application No. 10-2020-0059105, filed on May 18, 2020, the disclosure of which is incorporated herein by reference in its entirety.

BACKGROUND

Technical Field

The present disclosure relates to an apparatus and method for providing interactive content on the basis of a user's playing, and more particularly, to a technology for newly generating content with unique individuality of a user by reflecting, in interactive content, information on a process in which the user plays the interactive content and information which may reflect individuality of the user.

Discussion of Related Art

In existing content, such as movies, dramas, and books, a plot proceeds according to a story determined by a creator and come to an end. However, some people have plots or other endings desired by themselves that are unlike a determined plot. For this reason, people intervene in a story to create supplementary stories or chat about other ends that they imagine in Internet communities.

Due to such a desire of people, interactive content of which a storyline and an end can be selected by users is attracting attention recently. The plot of interactive content may vary depending on selections of users made while the story proceeds, and the end of interactive content may also vary as well depending on selections of users.

However, most of currently existing interactive content is only focused on differentiating a story according to selection of a user. Recently, functions are required for a user to intervene in various elements of content beyond the storyline. For example, there is a demand for personalized content, realistic content, etc. which reflect information (face, voice, name, etc.) of a user so that the user may feel the content more dynamically.

SUMMARY

The above-described interactive content may have an ending as well as a plot varying depending on selection of a user. Therefore, individual users may create totally different stories according to the users' selection even while enjoying the same kind of content.

Accordingly, the present disclosure is directed to providing a technology for providing a user with new content which reflects a development process of interactive content determined and completed by the user.

In addition, the present disclosure is direction to providing a technology not only for giving a user autonomy in influencing a story but also for reflecting individuality of the user in various elements, such as characters who appear in interactive content and voice.

To this end, exemplary embodiments of the present disclosure provide a technology for facilitating a change in the development of interactive content and effectively reflecting information of a user who plays the content in the content by creating the interactive content so that a video of the interactive content may be replayed in units of animations including object information, which specifies objects to be output in the video, and driving information, which defines motion of the objects, unlike a format of interactive content of which a video to be output is determined in units of frames.

In some embodiments, a method for providing interactive content to be performed by an interactive content providing apparatus. The method includes: when a plurality of animation units including object information for specifying an object to be output in a video and driving information for defining motion of the object are played, providing interactive content played by the object moving according to the driving information to a user; receiving information of the user to be reflected in the interactive content; and inserting the information of the user into a part of the object information and playing at least one of the plurality of animation units to play the interactive content.

In at least one variant, the plurality of animation units are played in a preset sequence according to an animation method or played according to a diverging animation method of playing a subsequent animation unit determined on the basis of a first input of the user regarding a plurality of selection options for receiving selection of any one of the plurality of animation units or a second input of the user regarding object information which is output while a certain animation unit is played, further comprising: when an animation unit is played according to the diverging animation method, sensing the first input regarding the plurality of selection options or the second input regarding object information which is output while the animation unit is played; and playing an animation unit corresponding to the first input or the second input.

In another variant, the method further includes: storing an input of the user while the interactive content is played; and when the play is finished, generating second content in which animation units are replayed in a sequence corresponding to the input according to the information of the user.

In another variant, separately from the plurality of animation units, the interactive content further includes object reaction animation information for defining motion made by the object when an input for the object is sensed while the interactive content is played.

In another variant, the method further includes: specifying information on an event type, an input time, and an input value regarding the received information of the user and generating play information to which the specified information is mapped; and generating second content in which the interactive content is replayed according to the information on the event type, the input time, and the input information included in the play information.

In another variant, the method further includes providing the object information and the driving information constituting the animation units to the user and receiving editing information of the user regarding the object information, the driving information, or a replay sequence of the animation units, wherein playing the interactive content including information on the animation units reflecting the received editing information.

In another variant, the animation units further include voice information to be output in the video and subtitle information to be output according to the voice information in the video, and the voice information includes a voice file having a replay time of a preset time or less, further comprising, when the voice information is replayed in the video, outputting the subtitle information corresponding to the voice information in the video during the replay time.

In another variant, the method further includes: when an input for the subtitle output in the video is sensed, receiving a voice of the user corresponding to the subtitle information; inserting the voice of the user to the voice information corresponding to the subtitle information; and when the play is finished, generating second content in which the animation units are replayed to output the voice information to which the voice of the user is inserted according to the subtitle information.

In further another variant, the receiving step of the voice of the user corresponding to the subtitle information includes: outputting a first button for searching for a subtitle which is output before the subtitle information and a second button for searching for a subtitle which is output after the subtitle information; outputting the previous subtitle or the subsequent subtitle on the basis of an input of the user for the first button or the second button; and receiving a voice of the user corresponding to subtitle information which is output on the basis of the input of the user for the first button or the second button.

In yet further another variant, the receiving step of the voice of the user corresponding to the subtitle information further comprises imposing a charge on the user when the voice of the user is received for a preset time or more.

In yet further another variant, the method further includes, when the information of the user includes a facial image of the user, normalizing the facial image and replacing object information corresponding to a face of a character in the object information with the normalized facial image.

In yet further another variant, the replacing step of the object information includes: when a facial image is input by the user, normalizing the facial image to show a certain angle, shape, or expression using a certain artificial intelligence model which is trained to output an image obtained by modifying a facial image to show a certain angle, shape, or expression; specifying feature points of the normalized facial image as vertices; generating a three-dimensional model having a mesh structure obtained by connecting the vertices together; and replacing the object information corresponding to the face of the character in the object information with the three-dimensional model.

In yet further another variant, the playing of the interactive content comprises implementing motion or an expression by moving the vertices included in the three-dimensional model according to the driving information.

In yet further another variant, the implementing of the motion or the expression comprises: specifying a first vertex at which motion will be started and a second vertex at which the motion will be finished among the vertices included in the three-dimensional model; and controlling the first vertex to move toward the second vertex to implement motion or an expression by moving the vertices included in the three-dimensional model according to the driving information.

In yet further another variant, the implementing of the motion or the expression comprises: specifying a first vertex at which motion will be started and a second vertex at which the motion will be finished among the vertices included in the three-dimensional model where the first vertex includes a plurality of vertices connected to one or more different vertices, and the second vertex includes as many vertices as the plurality of vertices; determining faces that each connect the plurality of first vertices to the plurality of second vertices that are each specified as end positions of motion of the plurality of first vertices at the shortest distance among faces included in the three-dimensional model; specifying n (n is a natural number greater than or equal to one) positions along certain lines extending from the first vertices to the second vertices on the basis of the faces; and controlling the first vertices to move toward the second vertices via the n positions to implement the motion.

In yet further another variant, the replacing of the object information corresponding to the face of the character in the object information with the normalized facial image comprises imposing a charge on the user when a facial image is inserted to a character in addition to a basic character in the object information.

In yet further another variant, the method further includes: when the information of the user includes the facial image of the user, analyzing the facial image on the basis of a certain artificial intelligence algorithm to extract first tag information representing attributes of the facial image; and comparing second tag information, which is mapped to object information corresponding to faces of characters, with the first tag information and inserting the facial image to a character having the largest number of pieces of second tag information corresponding to the first tag information, wherein the second tag information is mapped to the object information corresponding to the face of the character and stored in advance or extracted from an image of the character on the basis of a certain artificial intelligence algorithm.

In yet further another variant, the method further includes: when the information of the user includes the facial image of the user, adjusting a tone of the facial image; and applying a face filter to modify the facial image according to certain rules.

In yet further another variant, the method further includes, when the information of the user includes the facial image of the user and the facial image deviates from a standard of facial information predetermined on the basis of a certain artificial intelligence algorithm, requesting an input of another facial image.

In yet further another variant, the method further includes outputting the object information according to coordinate information corresponding to a standard selected by the user on the basis of coordinate information for presetting locations at which the object information is output depending on different standards.

In yet further another variant, the method further includes: receiving a surrounding video obtained by imaging surroundings with a camera part of the interactive content providing apparatus; and disposing the object information on a layer of the surrounding video on the basis of coordinate information for presetting locations at which the object information is output in a display part of the interactive content providing apparatus and outputting the object information on the display part or disposing the object information on the layer of the surrounding video on the basis of a function designed to map the object information to one position in the surrounding video and outputting the object information on the display part.

In yet further another variant, the method further includes: inputting first object information to an artificial intelligence model, which is trained to determine a class of input object information and map driving information corresponding to the class to the input object information, and mapping first driving information determined by the artificial intelligence model to the first object information; and when the user's input for an object corresponding to the first object information is sensed, executing the first driving information.

In yet further another variant, the object information further includes information on a user model which reflects a character's face or the user's face and a second object which is represented together with the user model on the basis of relative distance from the user model, and the playing of the interactive content comprises setting, when the user model moves according to the driving information, distance between one or more vertices included in the user model and the second object to be constant to play the interactive content.

In other embodiments, an apparatus for providing interactive content includes: an input interface configured to sense an input of a user; a display part configured to output a video; at least one memory configured to store instructions for performing a certain operation; and at least one processor operably connected to the at least one memory and configured to execute the instructions, wherein the at least one processor provides, when a plurality of animation units including object information for specifying an object to be output in the video and driving information for defining motion of the object are played, interactive content played by the object moving according to the driving information to the user; receives information of the user to be reflected in the interactive content, and inserts the information of the user to a part of the object information and plays at least one of the plurality of animation units to play the interactive content.

A computer-readable recording medium in which a computer program including instructions for causing a processor to perform the method of claim 1 is recorded.

However, technical objects of the present disclosure are not limited to those mentioned above, and various technical objects may be derived from the following description within a range apparent to those of ordinary skill in the art.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 4 is an example diagram illustrating play information used in generating second content;

FIG. 5B is an example diagram illustrating a subtitle B output in second content;

DETAILED DESCRIPTION OF EXEMPLARY EMBODIMENTS

Figure 1:
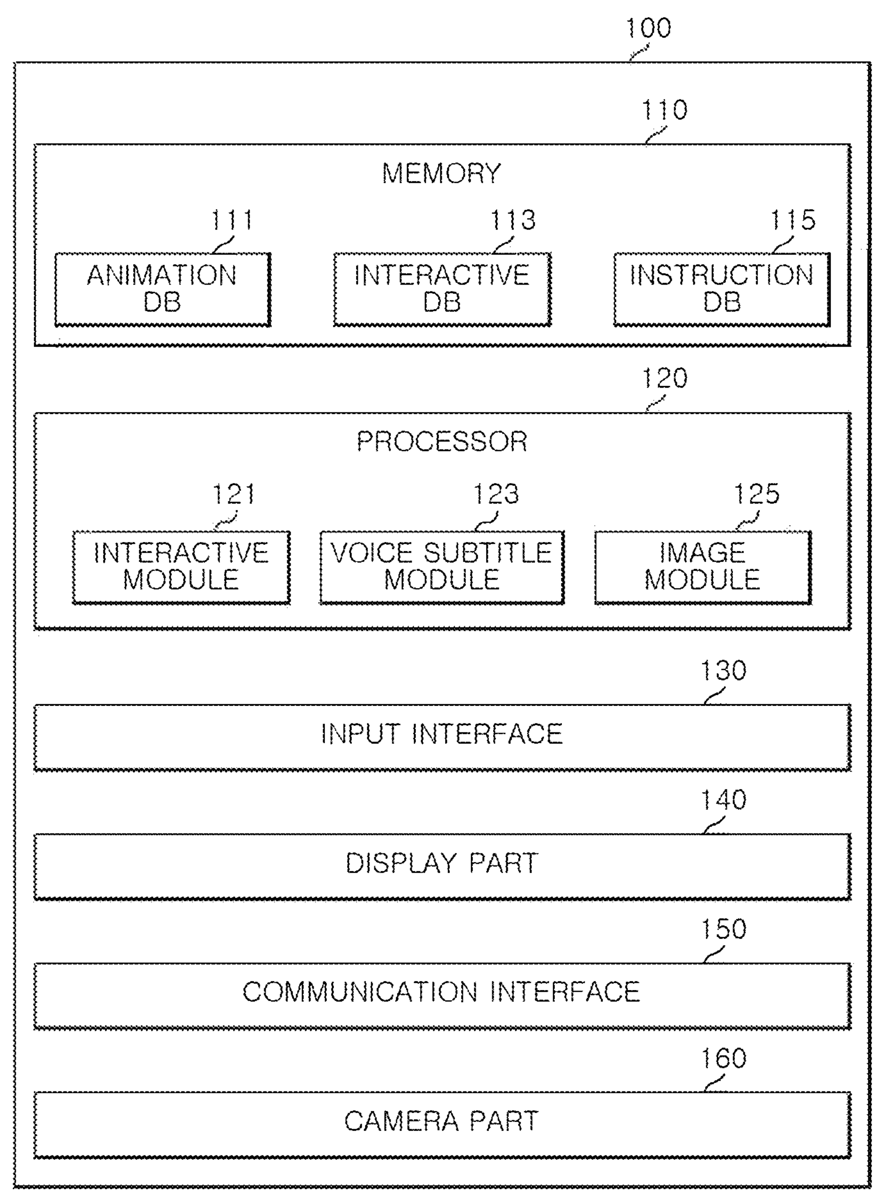
FIG. 1 is a functional block diagram of an apparatus for providing interactive content according to an exemplary embodiment of the present disclosure.

The advantages and features of the present disclosure and methods of accomplishing such will be clearly understood from the following description taken in conjunction with the accompanying drawings. However, the present disclosure is not limited to those embodiments described, as embodiments may be implemented in various forms. It should be noted that the present embodiments are provided to make a full disclosure and also to allow those skilled in the art to know the full range of the present disclosure. Therefore, the scope of the present disclosure should be defined only by the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition made should be based in consideration of the contents of the entire specification.

Functional blocks illustrated in the drawings and described below are merely examples of possible implementations. In other implementations, different functional blocks may be used without departing from the scope of the detailed description. Although one or more functional blocks of the present disclosure are illustrated as separate blocks, one or more of the functional blocks of the present disclosure may be a combination of various hardware and software elements executing the same function.

Further, it should be understood that an expression that some elements are "included" is an expression of an "open type" and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

In addition, the terms such as "first and/or second and/or third" used herein are used to distinguish various elements of the invention, and are not intended to limit order/sequence of the invention.

Hereinafter, embodiments of the present disclosure will be described with reference to the accompanying drawings.

FIG. 1 is a functional block diagram of an apparatus 100 for providing interactive content according to an exemplary embodiment of the present disclosure. Referring to FIG. 1, the apparatus 100 for providing interactive content according to the exemplary embodiment may include a memory 110, a processor 120, an input interface 130, a display part 140, a communication interface 150, and a camera part 160.

The memory 110 may include an animation database (DB) 111, an interactive DB 113, and an instruction DB 115 to store information and instructions for implementing exemplary embodiments of the present disclosure.

The animation DB 111 may store information on animation units constituting interactive content. Animation units are units for distinguishing animations that define how objects included in a video move. Animation units may include object information for specifying objects to be output in consecutive videos and driving information for defining motion of the objects.

In other words, object information is information on each object which is shown or provided to a user when a video is played and specifies objects such as characters, items, a background, voice, and subtitles. For example, object information may further include information on a three-dimensional user model which reflects a character's face or the user's face and a second object which may be represented together with the user model on the basis of relative distance from the user model.

Driving information may include information on at which time point and how each object moves or information on how the apparatus 100 responds to an input of the user.

Interactive content according to the exemplary embodiment of the present disclosure may be constituted of such animation units. When animation units are run, interactive content proceeds, and a process in which the user plays the interactive content is reflected in information included in the animation units so that information reflecting the user's individuality may be reflected in object information or driving information.

The interactive DB 113 may receive and store information of the user to be reflected in the interactive content. Also, the interactive DB 113 may store the information of the user which is improved or modified according to a certain algorithm. For example, the user information may include a facial image of the user, voice of the user, and various types of information input while the user plays the interactive content.

The instruction DB 115 may store instructions for causing the processor 120 to perform operations, which will be described below, or computer codes for performing operations corresponding to the operations of the processor 120 to be described below.

The processor 120 may control overall operation of the elements of the apparatus 100 for providing interactive content, that is, the memory 110, the input interface 130, the display part 140, and the communication interface 150. The processor 120 may include an interactive module 121, a voice subtitle module 123, and an image module 125. The processor 120 may operate the interactive module 121, the voice subtitle module 123, and the image module 125 by executing the instructions stored in the memory 110. Operations performed by the interactive module 121, the voice subtitle module 123, and the image module 125 may be understood as operations performed by the processor 120.

When the user plays the interactive content, the interactive module 121 may control overall development of the interactive content and generate second content by storing information related to the user. For example, the interactive module 121 may determine development of the interactive content on the basis of an input of the user, reflect information input by the user in the interactive content, and generate second content obtained by storing a record of the user playing the interactive content.

The voice subtitle module 123 controls overall operation related to subtitles and sound. For example, when the voice subtitle module 123 senses an input of the user with regard to a subtitle output on the display part 140, the voice subtitle module 123 may receive the user's voice, map the voice to subtitle information as voice information corresponding to the subtitle, and store the voice information.

The image module 125 controls overall operation related to images. For example, when a facial image is input by the user, the image module 125 may alter or modify the facial image according to a certain purpose, determine whether the input image is suitable for the purpose, and reflect the input image in the interactive content.

The input interface 130 may receive a physical stimulus, voice, image, etc. input by the user. For example, the input interface 130 may include hardware modules such as a decompression sensor, an electrostatic sensor, a microphone, and a camera.

The display part 140 may output a video so that the user may play the interactive content. To this end, the display part 140 may have a hardware element which includes a display panel for outputting a video, but the type of hardware constituting the display part 140 is not limited to the example.

The communication interface 150 communicates with an external device to transmit and receive information. To this end, the communication interface 150 may include a wireless communication module or a wired communication module.

The camera part 160 may generate a surrounding video by capturing surroundings of the apparatus 100 for providing interactive content. To this end, the camera part 160 may include a camera module which is a hardware element.

Characteristics of interactive content provided by the apparatus 100 for providing interactive content according to the exemplary embodiment of the present disclosure will be described first below with reference to FIGS. 2 and 3. After that, the overall flow of operation performed by the processor 120 to achieve the objects of the present disclosure will be described, and then, specific embodiments in which user information is reflected in interactive content will be described with reference to FIGS. 4 to 7.

First, animation units constituting interactive content according to the exemplary embodiment of the present disclosure will be described in further detail below.

Figure 2:
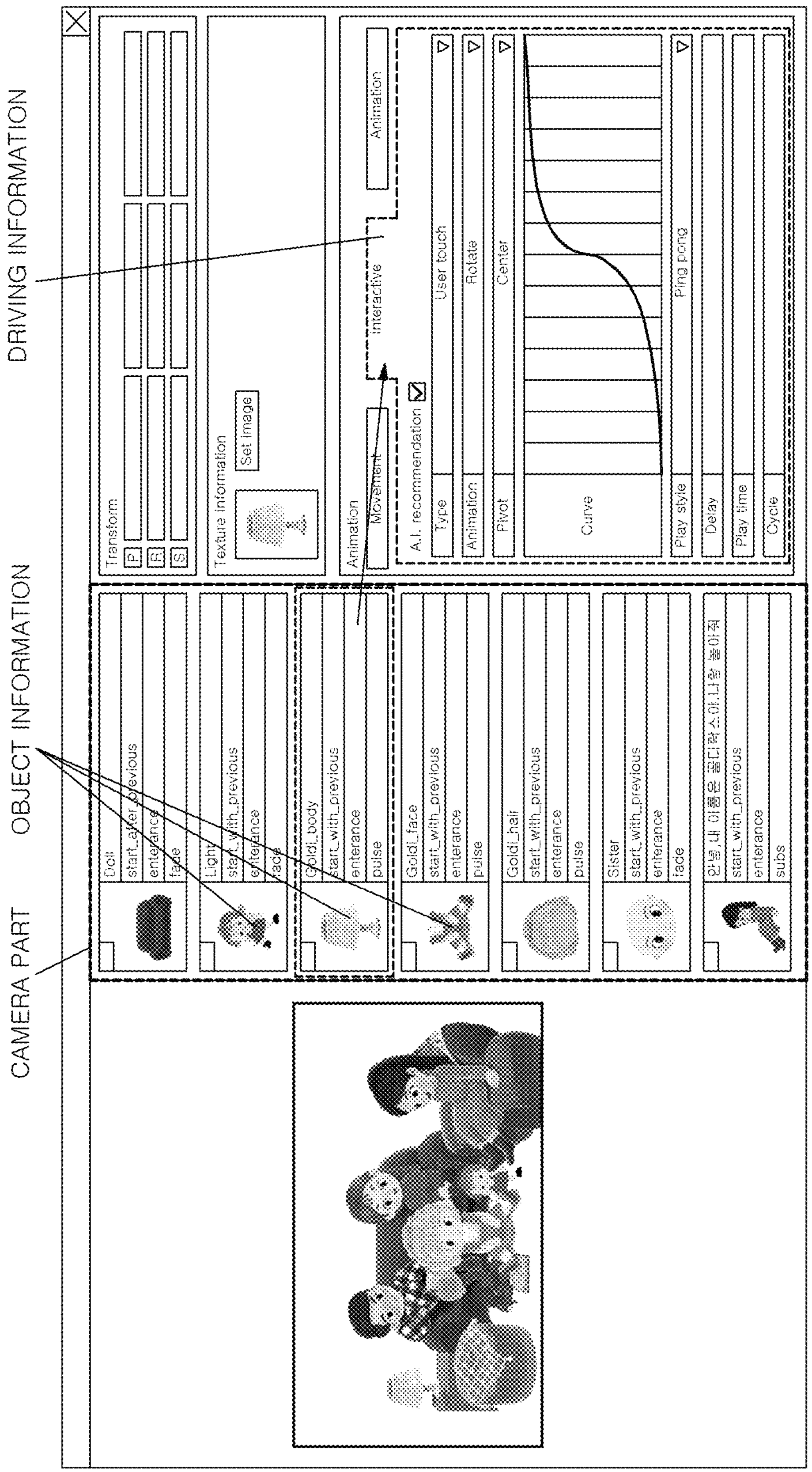
FIG. 2 is an example diagram illustrating object information and driving information included in an animation unit according to the exemplary embodiment of the present disclosure.
Figure 3:
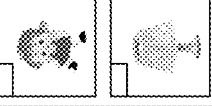
FIG. 3 is an example diagram illustrating voice information and subtitle information included in an animation unit according to the exemplary embodiment of the present disclosure.

FIG. 2 is an example diagram illustrating object information and driving information included in an animation unit according to the exemplary embodiment of the present disclosure, and FIG. 3 is an example diagram illustrating voice information and subtitle information included in an animation unit according to the exemplary embodiment of the present disclosure.

Interactive content according to the exemplary embodiment includes a plurality of animation units. An animation unit may include object information, driving information, subtitle information, and voice information. The object information is information for specifying an object to be output in a video. The driving information is information for defining motion of the object. The subtitle information is information on description about the story of the video or information on text which is output in the video as a character's words. The voice information is information on voice of reading text corresponding to a subtitle as sound. Accordingly, when the user starts playing interactive content, the interactive module 121 may play animation units included in the interactive content so that object information included in the animation units may work according to driving information, thereby causing the interactive content to proceed. While the interactive content proceeds, a subtitle based on subtitle information and voice based on voice information may be output.

The interactive module 121 may control a turn or time point at which each piece of driving information is driven according to a predefined sequence or time point.

Separately from the plurality of animation units, the interactive content according to the exemplary embodiment of the present disclosure may further include object reaction animation information for defining motion made by a specific object when an input for the object is sensed while the interactive content is played. The interactive module 121 may control the specific object to move according to the object reaction animation information on the basis of an input of the user for object information output to the display part 140. For example, the object "clock" may be present in object information, and any animation unit may be played. In this case, the interactive content may include object reaction animation information for defining an operation of moving the clock, an operation of outputting a voice telling a current time, etc. when an input of the user for the clock (e.g., touching the clock which is an object) while the clock is output in the display part 140.

FIG. 3 is an example showing voice information and subtitle information included in an animation unit. The voice information and the subtitle information may be mapped to one piece of driving information and stored. As soon as specific driving information is executed, the voice subtitle module 123 may output subtitle information and voice information.

Next, a method of running each of animation units will be described according to exemplary embodiments.

The interactive module 121 may determine the sequence of playing a plurality of animation units included in the interactive content. For example, an animation play method according to an exemplary embodiment may include an animation method in which a plurality of animation units are played in a preset sequence.

Also, an animation play method according to the exemplary embodiment may include a diverging animation method of playing a subsequent animation unit determined on the basis of a first input of a user regarding a plurality of selection options for receiving selection of any one of a plurality of animation units or a second input of the user regarding object information which is output while a certain animation unit is played. When an animation unit corresponding to the diverging animation method is played, the interactive module 121 may output a plurality of selection options (e.g., selections of a protagonist in a story flow) in the display part 140 to sense a first input of the user regarding a specific selection option or may sense a second input of the user regarding specific object information to play an animation unit determined to be played in response to a user input.

The apparatus 100 for providing interactive content may provide object information and driving information constituting animation units so that the user (e.g., a player, an administrator, and a developer) may edit the object information and the driving information. To this end, when the user requests editing, the interactive module 121 may provide object information and driving information constituting each animation unit to the user and receive editing information of the user for the play sequence of animation units. Accordingly, the interactive module 121 plays interactive content including information on the animation units reflecting the input editing information so that the content of which object information or driving information is modified according to the user's preference may be played to show another object or reflect motion wanted by the user. Also, the play sequence of animation units may be controlled on the basis of the user's editing.

Next, an overall operation process of the apparatus 100 for providing interactive content according to the exemplary embodiment will be described.

First, the processor 120 may provide the above-described interactive content according to exemplary embodiments of the present disclosure to a user, receive information of the user to be reflected in the interactive content from the user before or while the interactive content is played, and store the received user information. Accordingly, the processor 120 may insert the received user information into some pieces of object information included in the interactive content and replay at least one of a plurality of animation units to play the interactive content. Subsequently, when the user's play is finished, the processor 120 may generate second content in which animation units are replayed according to information input by the user while the user plays the interactive content.

The second content according to the exemplary embodiment is a video in which animation units are run in a sequence corresponding to inputs made by the user to proceed with the story by playing the interactive content. In addition, the second content is a video which is obtained by replaying the story played by the user and also reflects all information (information about a touch on a specific object during the play, play time, a facial image, voice, etc.) input by the user. To this end, according to the exemplary embodiment of the present disclosure, play information is generated as shown in FIG. 4.

FIG. 4 is an example diagram illustrating play information used in generating second content. Referring to FIG. 4, the interactive module 121 may specify information on a type of event, an input time, and an input value regarding input information input by a user who plays interactive content and generate play information to which the specified information is mapped. The type of event specifies the type of an event caused by the user. For example, "next page," "object touch," "previous page," "select first one of three options," etc. are the types of events input and caused by the user. The input time denotes a time point or time at which the user causes the corresponding event. The input value may denote information generated or received according to an input of the user such as coordinates of a position, voice information, or an image input by the user to generate an event.

Accordingly, after play of the interactive content is finished, the interactive module 121 may generate second content which is a video of the interactive content replayed according to the information on the type of event, the input time, and the input value included in the play information. For example, when the input value included in the play information indicates coordinates of an input position, the interactive module 121 may replay the content so that the position may be input at the input time included in the play information. Also, when the input value included in the play information is voice information, the interactive module 121 may replay the voice information included in the input value as the type of event (e.g., a voice record on a subtitle)

included in the play information. Further, when the input value included in the play information is a facial image, the interactive module 121 may replay the facial image included in the input value as the type of event (e.g., replacing the face of a character with an image) included in the play information.

Next, the difference between interactive content and second content will be described.

Second content according to the exemplary embodiment is a video in which animation units are run in a sequence corresponding to inputs made by the user to proceed with the story by playing interactive content. In addition, second content is a video which reflects all information (information about a touch on a specific object during a play, play time, a facial image, voice, etc.) input by the user.

Figure 5A:
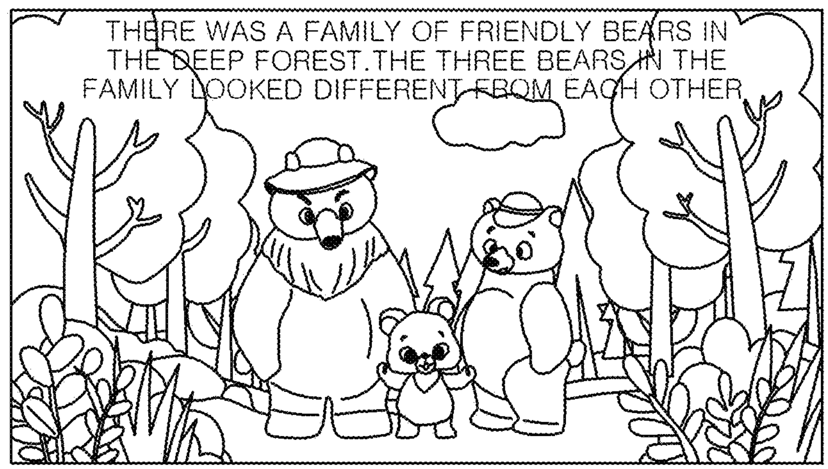
FIG. 5A is an example diagram illustrating a subtitle A output in a process of playing interactive content.

FIGS. 5A and 5B are example diagrams illustrating the difference between a subtitle A output in a process of playing interactive content and a subtitle B output in second content.

Referring to FIGS. 5A and 5B, while interactive content is played as shown in FIG. 5A, the voice subtitle module 123 may output several rows of subtitles in one screen by executing a plurality of pieces of subtitle information and output voice information corresponding to the plurality of pieces of output subtitle information so that the user may have the feeling of a storybook which reads subtitles for the user. However, as shown in FIG. 5B, the second content may only output replayed voice information and the corresponding subtitle information to give the feeling of an animation or movie.

With regard to such a method of synchronizing voice information with subtitle information while only outputting voice information and the corresponding subtitle information, when the video is configured to be replayed in units of frames, a subtitle may be replayed according to a frame time at which specific voice is replayed as in a related art. However, according to the exemplary embodiment of the present disclosure, a video is replayed not in units of frames but in units of animations according to a user's selection, and thus it is difficult to specify the time at which a subtitle is output.

To solve this problem, voice information may include a voice file having a replay time of a preset time or less, and when voice information is replayed in second content, the voice subtitle module 123 may only output subtitle information corresponding to the replayed voice information during the replay time only. In other words, subtitle information corresponding to the replay time of each piece of voice information is output during the replay time so that the feeling of an animation or movie may be given by synchronizing replayed voice information with subtitle information corresponding to the voice information even in a configuration with animation units.

Next, a process of receiving information of various users and reflecting the received information in interactive content and second content will be described according to exemplary embodiments.

Figure 6:
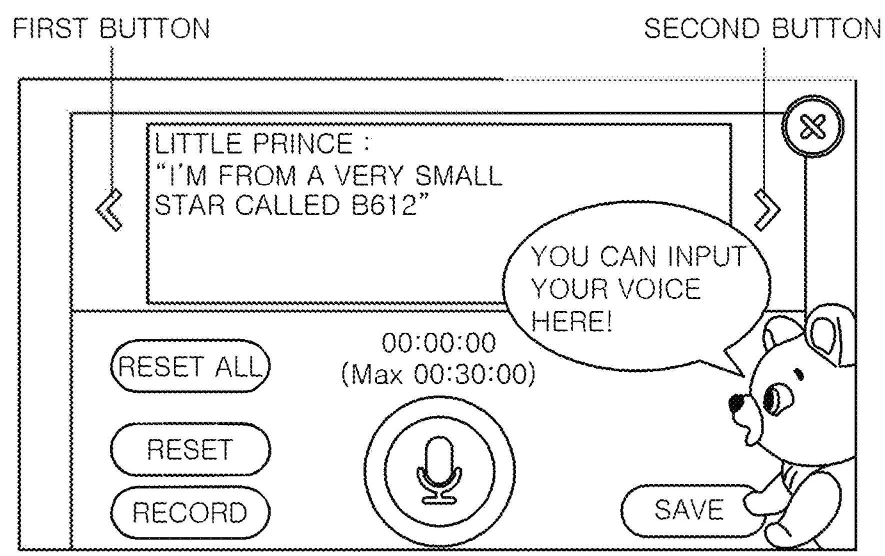
FIG. 6 is an example diagram illustrating an operation of inputting a user's voice into interactive content.

FIG. 6 is an example diagram illustrating an operation of inputting a user's voice into interactive content.

When a user input is sensed regarding a subtitle output in a video while interactive content is played, the voice subtitle module 123 may receive a user's voice corresponding to subtitle information. For example, an input interface window may be output in the display part 140 as shown in FIG. 6 to guide the user through a voice input process. Accordingly, when a voice of the user is input through the input interface 130, the voice subtitle module 123 may insert the user's voice to voice information corresponding to subtitle information. When play of the interactive content is finished, second content in which animation units are replayed may be generated so that the voice information to which the user's voice is inserted may be output together with the subtitle information.

In this case, in the window of the input interface 130, a first button for searching for a subtitle which is output before subtitle information to be recorded by the user and a second button for searching for a subtitle which is output after the subtitle information to be recorded by the user may be output. The voice subtitle module 123 may output the previous subtitle or the subsequent subtitle on the basis of the user input for the first button or the second button. Also, the voice subtitle module 123 may receive the user's voice corresponding to the subtitle information output on the basis of the user's input for the first button or the second button and generate second content, in which animation units are replayed to output voice information to which the user's voice is inserted together with the subtitle information, when play of the interactive content is finished.

Meanwhile, when the user's voice is input for a preset time or more in the above-described embodiment of receiving the user's voice or a voice is input for several characters, a charge may be imposed on the user in proportion to the time or the number of characters.

Figure 7:
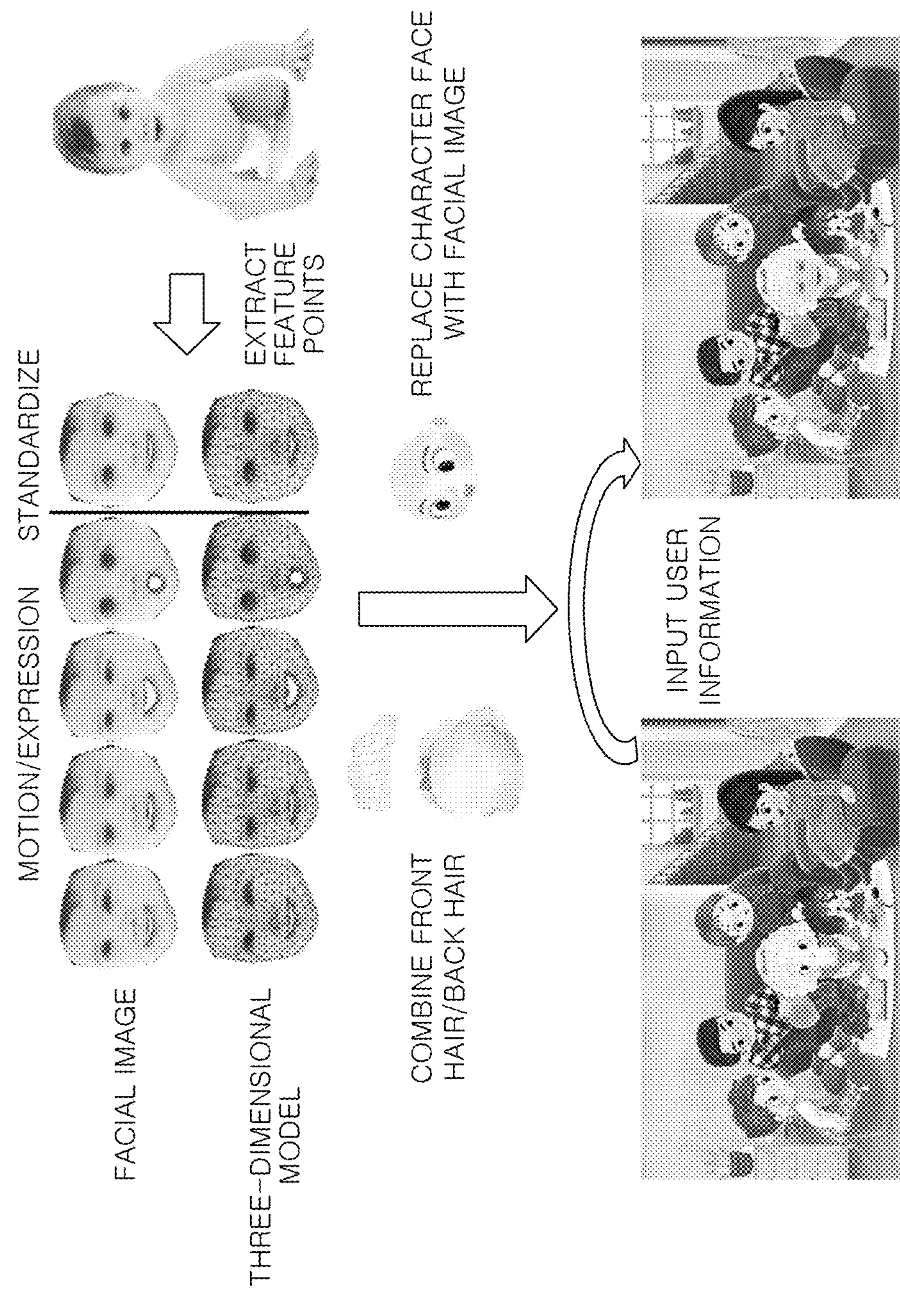
FIG. 7 is a first example diagram illustrating an operation of inputting a user's facial image into interactive content.
Figure 8:
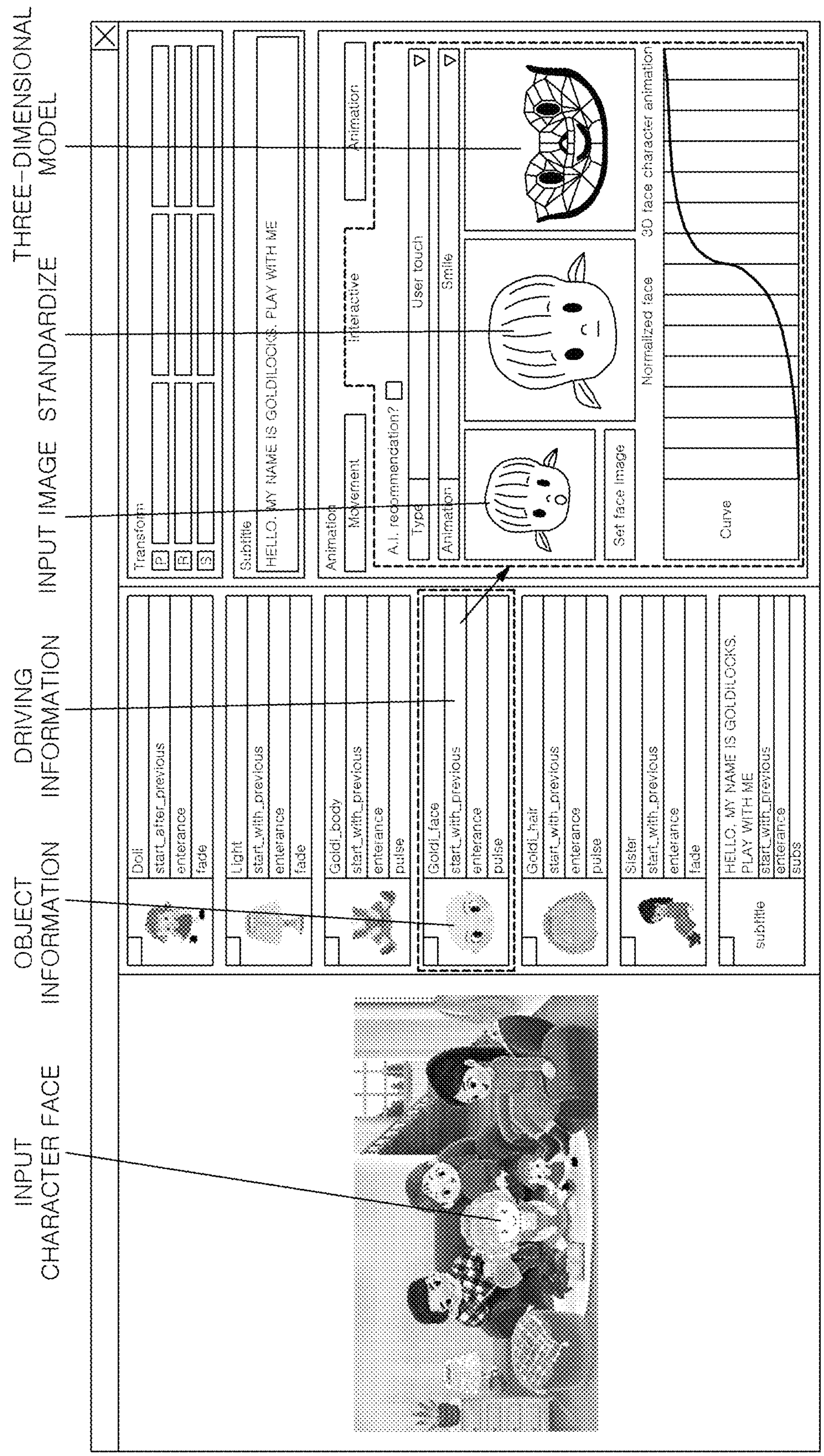
FIG. 8 is a second example diagram illustrating an operation of inserting a user's facial image into interactive content.

FIG. 7 is a first example diagram illustrating an operation of inputting a user's facial image into interactive content, and FIG. 8 is a second example diagram illustrating an operation of inserting a user's facial image into interactive content.

Referring to FIG. 7, the image module 125 may receive information of the user before or while interactive content is played. When a certain image is input in the information of the user, the image may include a facial image. In this case, the image module 125 may normalize the facial image to look at a specific position and replace object information corresponding to a character's face in object information with the normalized facial image.

According to the embodiment of performing normalization, when a facial image is input by the user, the image module 125 may normalize the facial image to show a certain angle, shape, or expression using various artificial intelligence (AI) models which are trained to output an image obtained by modifying a facial image to show a certain angle, shape, or expression. Then, the image module 125 may extract feature points of the facial image according to various algorithms for extracting feature points and specify the extracted feature points as vertices. Subsequently, the image module 125 may generate a three-dimensional model having a mesh structure, which is a set of polygons including vertices, edges, and faces, by connecting vertices to each other.

Accordingly, the image module 125 normalizes the three-dimensional model to show a specific angle and shape by controlling the locations of the vertices so that the facial image may look at a specific position. Also, the image module 125 may replace object information corresponding to a character's face in object information with the three-dimensional model. In this case, previously stored front hair and back hair images of the character may be combined with the user's facial image, and thus the character's facial image may be naturally replaced with the user's facial image. For example, when there are three types of images, a front hair image, a back hair image, and a facial image, the image module 125 may arrange layers of the front hair image, the facial image, and the back hair image in front-to-back order and then combine the arranged layers with each other so that the character's face may be naturally replaced with the user's face.

Also, the image module 125 may implement motion or an expression of the facial image by controlling the vertices included in the three-dimensional model to move according to driving information. In this case, facial images may be additionally put on characters other than the basic character in the object information. Then, the image module 125 may impose a charge on the user in proportion to the number of characters to which input facial images are inserted.

Accordingly, referring to FIG. 8, original object information may be replaced with an image of which three-dimensional modeling is finished on the basis of the facial image input by the user, the normalized facial image, and three-dimensional modeling image, and motion may be implemented in the image of which three-dimensional modeling is finished. An operation of implementing motion may include the example of FIG. 9.

Figure 9:
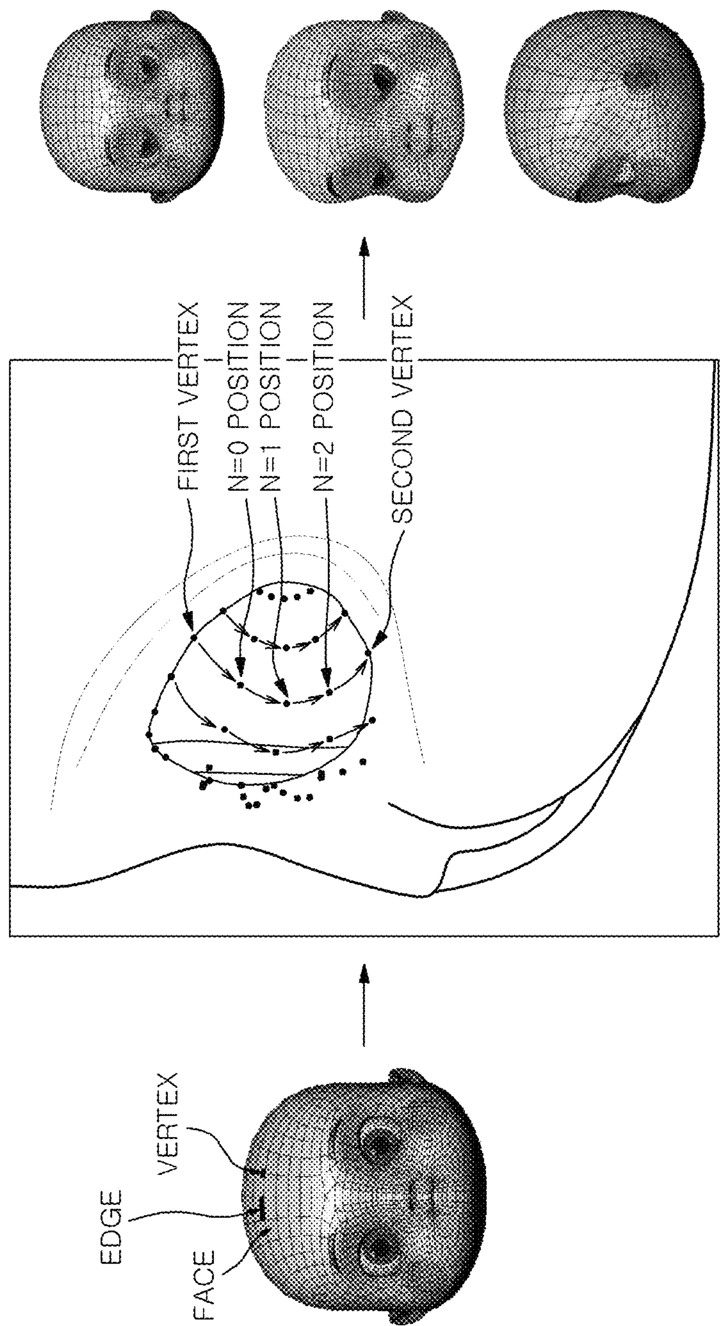
FIG. 9 is an example diagram illustrating an operation of inputting a user's facial image into interactive content and implementing an expression or motion in the input facial image.

FIG. 9 is an example diagram illustrating an operation of inserting a user's facial image into interactive content and implementing an expression or motion in the inserted facial image.

First, the image module 125 may specify a first vertex at which motion will be started and a second vertex at which the motion will be finished among vertices included in the three-dimensional model. Each of the first vertex and the second vertex may include one or more vertices. When both the first vertex and the second vertex include a plurality of vertices, the first vertex may be connected to one or more different vertices, and the second vertex may include as many vertices as the plurality of vertices.

For example, when the three-dimensional model has a facial shape, a motion of closing eyes may be implemented. In this case, the image module 125 may specify vertices located on the skin above the eyes as first vertices and specify vertices located on the skin under the eyes as second vertices. As an example, motion of eyelids is described according to the exemplary embodiment of the present disclosure, but the technology according to the exemplary embodiment of the present disclosure is not limited to the example.

After the first vertices and the second vertices are specified, the image module 125 may determine vertices, edges, or faces connecting the first vertices and the second vertices between the first vertices and the second vertices. For example, the image module 125 may determine vertices, edges, or faces which connect the first vertices and the second vertices at the shortest distance.

Also, when the first vertex and the second vertex include a plurality of vertices, the image module 125 may specify n (n is a natural number greater than or equal to one) positions along a certain line reaching to each of the plurality of second vertices which are each specified as end positions of motion of the plurality of first vertices. An operation of the image module 125 specifying n positions along a certain line between the first vertex and the second vertex may be performed according to various embodiments given below. The embodiments set forth herein are just exemplary, and the present disclosure is not limited thereto.

According to the exemplary embodiment, the image module 125 may specify each of vertices which constitute edges connecting first vertices and second vertices as one of n positions. For example, in the case of causing eyelids to cover the eyes, there may be four edges connecting a first vertex and a second vertex. Then, three vertices connecting the edges may be specified as n=0 position, n=1 position, and n=2 position.

When the first vertex or the second vertex includes a plurality of vertices, the image module 125 may specify positions evenly dividing a shortest virtual line connecting the first vertex and the second vertex into n+1 portions as the n positions on faces connected to the plurality of second vertices each specified as end positions of motion of the plurality of first vertices. Referring to FIG. 8, in the case of causing eyelids to cover the eyes, three positions which evenly divide a shortest virtual line connecting a first vertex and a second vertex into four portions may be specified as n=0 position, n=1 position, and n=2 position along faces connecting the first vertex and the second vertex.

After the n positions are specified, the image module 125 may control location data of the first vertex so that the first vertex may move toward the second vertex via the n positions to implement the motion. Also, the image module 125 may control vertices other than the first vertex present within a certain range from the first vertex to move along with the first vertex. This may be implemented through various feature point algorithms and is not limited to a specific method.

The image module 125 may implement natural motion by controlling the first vertex to finally reach to the second vertex via n=0 position, n=1 position, and n=2 position. In this case, as shown in Equation 1 below, the image module 125 may determine a speed function which reflects speed of the first vertex until the first vertex moves to any one of the n positions. Accordingly, the speed of the first vertex is determined on the basis of a characteristic which may reflect actual motion, and thus motion of the three-dimensional model may be made natural.

$$B = B_0 + \sum_{k=0}^{n} \sum_{i} f(w_{ki}) \vec{B}_{ki} \quad \text{[Equation 1]}$$

{$B_0$ is a first vertex, B is a location to which the first vertex is moved according to Equation 1, i is an index indicating a type of motion such as the motion of closing eyes, the motion of opening a mouth, the motion of smiling, $\vec{B}_{ki}$ is a vector directed from a $k^{th}$ position toward a $(k+1)^{th}$ position during i motion ($\vec{B}_{0i}$ is a vector directed from the first vertex toward a first position and $\vec{B}_{ni}$ is a vector directed from an $n^{th}$ position toward a second vertex), $f(w_{ki})$ is a speed function having a value increasing over time in a section from the $k^{th}$ position toward the $(k+1)^{th}$ position during i motion, and $w_{ki}$ is a time variable of $f(w_{ki})$}

Also, the image module 125 may dispose a second object for a user model which reflects a character's face or the user's face. For example, when the user model is a three-dimensional model including a plurality of vertices, the user model may be generated to be represented together with the second object in a virtual space by setting the distance between one or more vertices included in the three-dimensional model and the second object to be constant. In this case, even when the expression or shape of the user model is changed according to driving information, the second object may be represented together at the constant distance from the user model. Accordingly, when interactive content is played and the user model moves according to driving information, the second object may move at the constant relative distance from the user model.

When a facial image is input by the user, the image module 125 may analyze the input facial image on the basis of various AI algorithms, such as an AI face recognizer, and extract first tag information (e.g., the facial image's age, sex, race, accessary, hairstyle, hair color, and eye color) representing attributes of the facial image. Subsequently, the image module 125 may compare second tag information mapped to object information corresponding to the face of a character (e.g., the character's age, sex, race, accessary, hairstyle, hair color, and eye color) with the first tag information and insert the input facial image to the character having the largest number of pieces of second tag information corresponding to the first tag information. In this case, the second tag information is mapped to object information corresponding to the character's face and stored in advance. Alternatively, the image module 125 may analyze the character's image on the basis of various AI algorithms, such as an existing AI face recognizer, and extract second tag information representing attributes of the character.

When a facial image is input by the user, the image module 125 may adjust the tone of the input facial image or correct the facial image through a photo filter. For example, when a facial image of the user is input, the image module 125 may correct the face tone on the basis of an existing photo correction algorithm, apply a cute face, young face, old face, etc. to the facial image using a filter for modifying a facial image according to certain rules on the basis of a photo filtering technology, and replace the character's face with the facial image.

When an image is input by the user, the image module 125 may determine whether the received image is appropriate for a character's face. For example, when an image of the user is input, the image may deviate from a predetermined standard of facial information (e.g., a covered face, closed eyes, or not including 90% or more of a frontal face) on the basis of various AI algorithms such as an AI face recognizer. In this case, the image module 125 may request an input of another facial image.

Since interactive content according to the above-described embodiment includes animation units including object information for specifying objects to be output in a video and driving information for defining motion of the objects, various elements of the content may reflect not only information on a process in which a user plays the interactive content but also individuality of the user, such as the user's face, voice, and play characteristics as the interactive content proceeds. Accordingly, the user can select the flow of a story and also generate unique content containing individuality of the user so that the user or the user's family member can become a character of content and play the content. In addition, the user can generate and store or share new content which is replayed to reflect a face or voice of the user or the user's friend or family member in the face or voice of a character of the interactive content.

Figure 10:
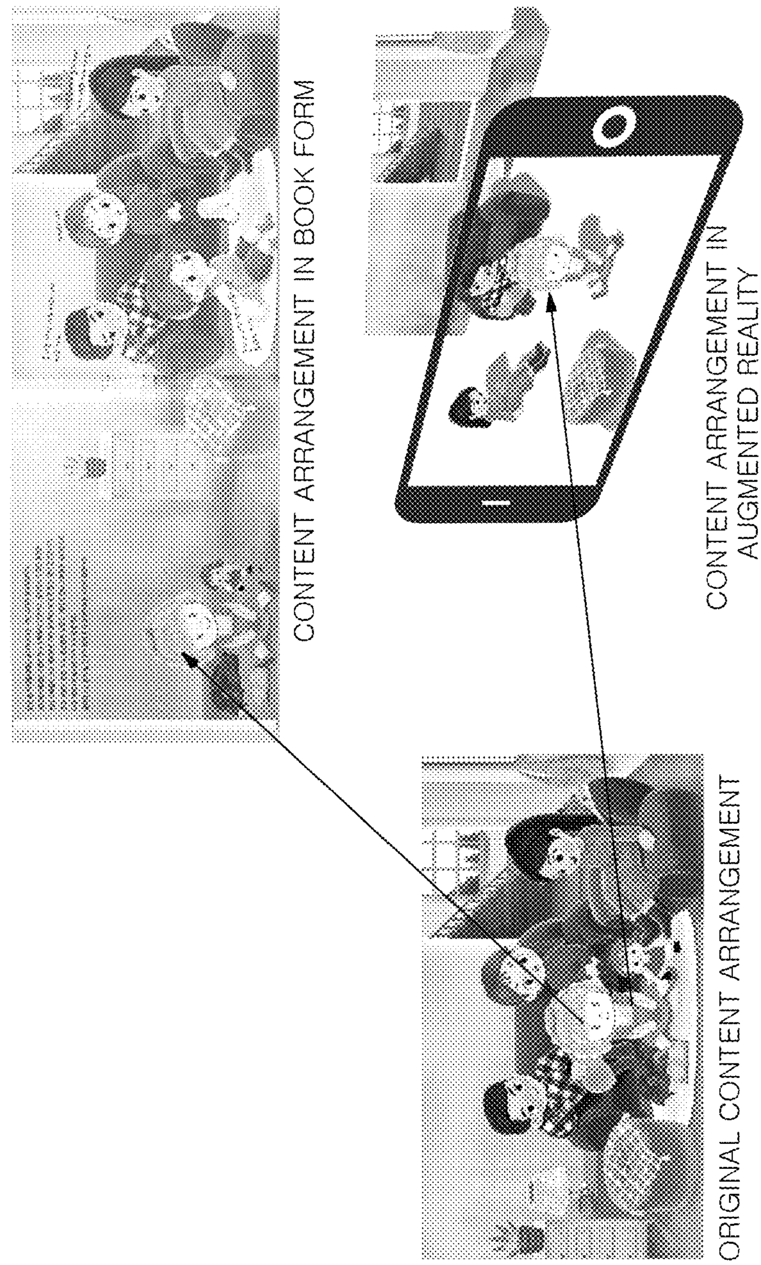
FIG. 10 is an example diagram illustrating an operation of changing the location of object information according to an environment in which the apparatus for providing interactive content is used.

FIG. 10 is an example diagram illustrating an operation of changing the location of object information according to an environment in which the apparatus for providing interactive content is used.

Referring to FIG. 10, the interactive module 121 may control the location of objective information output in the display part 140 according to a use environment in which the user plays interactive content.

For example, when a change from an original content standard (e.g., length:breadth=2.5:1) to a book-shaped content standard (e.g., length:breadth=5:1) is input, the interactive module 121 may control a location at which an object is output in one animation unit by outputting object information according to coordinate information corresponding to a standard selected by the user on the basis of coordinate information previously set depending on standards having different locations at which object information is output. Also, the interactive module 121 may move a location at which an object is output on the basis of resultant coordinate information output by inputting basic coordinate information to a function for defining distance that an object is moved depending on content standards.

Also, the interactive module 121 may output the image of object information on a video layer which outputs surroundings using an augmented reality (AR) technology. For example, the interactive module 121 may operate the camera part 160 to receive a surrounding video obtained by imaging the surroundings, dispose object information on a layer of the surrounding video on the basis of coordinate information for presetting locations at which object information is output in the display part 140, and output the object information in the display part 140.

Alternatively, the interactive module 121 may operate the camera part 160 to receive a surrounding video obtained by imaging the surroundings, dispose object information on a layer of the surrounding video on the basis of a function designed to map object information to one position in the surrounding video, and output the object information in the display part 140. In this case, since the object information is mapped to one position in the surrounding video, the object may be disposed at the position without any movement even when the user moves the camera to image another scene.

Figure 11:
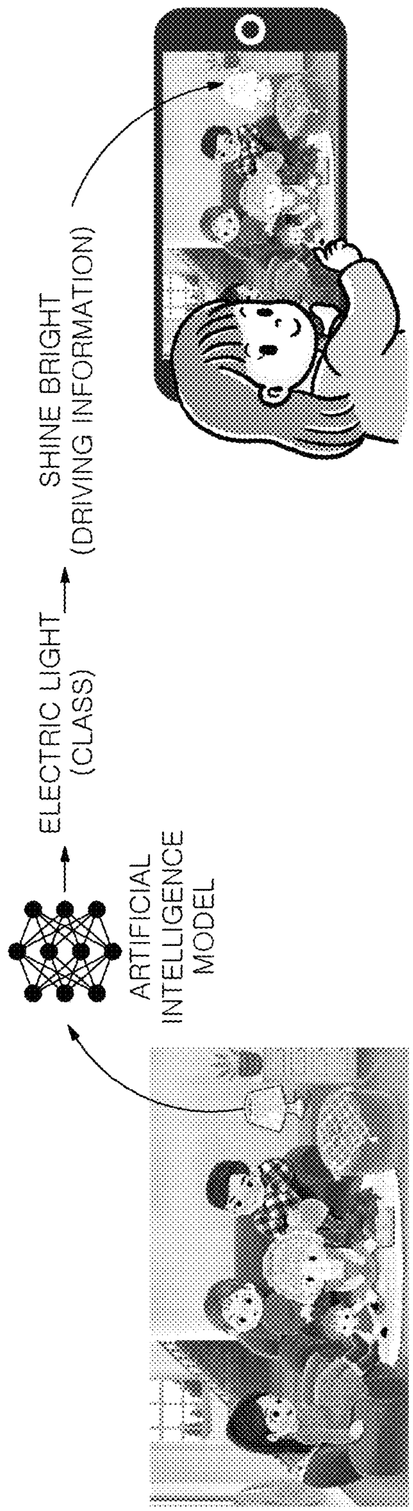
FIG. 11 is an example diagram illustrating an operation of specifying a class of object information through an artificial intelligence (AI) model and mapping driving information corresponding to the class to the object information according to the exemplary embodiment.

In the above embodiment, it has been described that object information and driving information are mapped to each other in advance, but object information and driving information may be mapped through an AI technology according to the exemplary embodiment of FIG. 11.

FIG. 11 is an example diagram illustrating an operation of specifying a class of object information through an AI model and mapping driving information corresponding to the class to the object information according to the exemplary embodiment.

Referring to FIG. 11, the interactive module 121 may determine a class (e.g., information for specifying a character, an electric light, a tree, an automobile, a bird, a clock, etc.) of object information input to a certain AI model and use an AI model which is trained to map corresponding driving information to the determined class. The interactive module 121 may input information on a first object among objects included in interactive content to the AI model, map first driving information determined by the AI model to the first object information, and store the first driving information and the first object information in the animation DB 111.

In this case, the AI model may also determine the class of the input object information and a type (e.g., a definition of motion such as vibrating motion, brightness adjustment, turning off a light, and a type of location movement) of driving information to be mapped to the class together. An AI model which is trained to map corresponding driving information to a determined class may be used. The interactive module 121 may input information on a first object among objects included in interactive content to the AI model and map first driving information determined by the AI model to the first object information. The interactive module 121 may input information on a first object among objects included in interactive content to the AI model, map class information output from the AI model to driving information, and store the class information and the driving information in the animation DB 111.

Accordingly, when the user's input for the first object information is sensed, the interactive module 121 may implement motion according to the first driving information.

An AI algorithm or AI model included in embodiments of the present disclosure may employ a machine learning algorithm. Machine learning refers to the field of defining various issues dealt with in the field of AI and studying methodology for solving the issues. Machine learning is also defined as an algorithm which enhances the performance of a task through steady experience with the task.

An artificial neural network (ANN) is a model used in machine learning and may mean a whole model of problem-solving ability which includes artificial neurons (nodes) constituting a network by synaptic connections. The artificial neural network may be defined by a connection pattern between neurons in different layers, a learning process for updating model parameters, an activation function for generating an output value, and the like.

The ANN may include an input layer, an output layer, and one or more optional hidden layers. Each layer includes one or more neurons, and the ANN may include synapses which link neurons to neurons. In the ANN, each neuron may output the function value of an activation function for input signals, weights, and biases input through the synapses.

Model parameters refer to parameters determined through learning and include weight values of synaptic connections and biases of neurons. A hyperparameter means a parameter to be set in the machine learning algorithm before learning and includes a learning rate, a repetition number, a mini batch size, an initialization function, and the like.

The purpose of learning of the ANN may be to determine the model parameters which minimize a loss function. The loss function may be used as an index to determine optimal model parameters in the learning process of the ANN.

Machine learning may be classified into supervised learning, unsupervised learning, and reinforcement learning.

The supervised learning may refer to a method of training an ANN with a label given for training data, and the label may mean the correct answer (or the result value) that the ANN should infer when the training data is input to the ANN. The unsupervised learning may refer to a method of training an ANN without a label given for training data. The reinforcement learning may refer to a method of training an agent defined in a certain environment to select a behavior or a behavior sequence which maximizes cumulative compensation in each state.

Machine learning, which is implemented as a deep neural network (DNN) including a plurality of hidden layers among ANNs, is also referred to as deep learning, and the deep learning is a part of machine learning. In this description, "machine learning" may include deep learning.

In addition to a deep learning algorithm, decision tree (DT), k-nearest neighbor (KNN), logistic regression (LR), multilayer perceptron (MLP), random forest (RF), support vector machine (SVM), lasso, etc. may be selected and used as an appropriate algorithm according to the types or number of parameters to be used.

Figure 12:
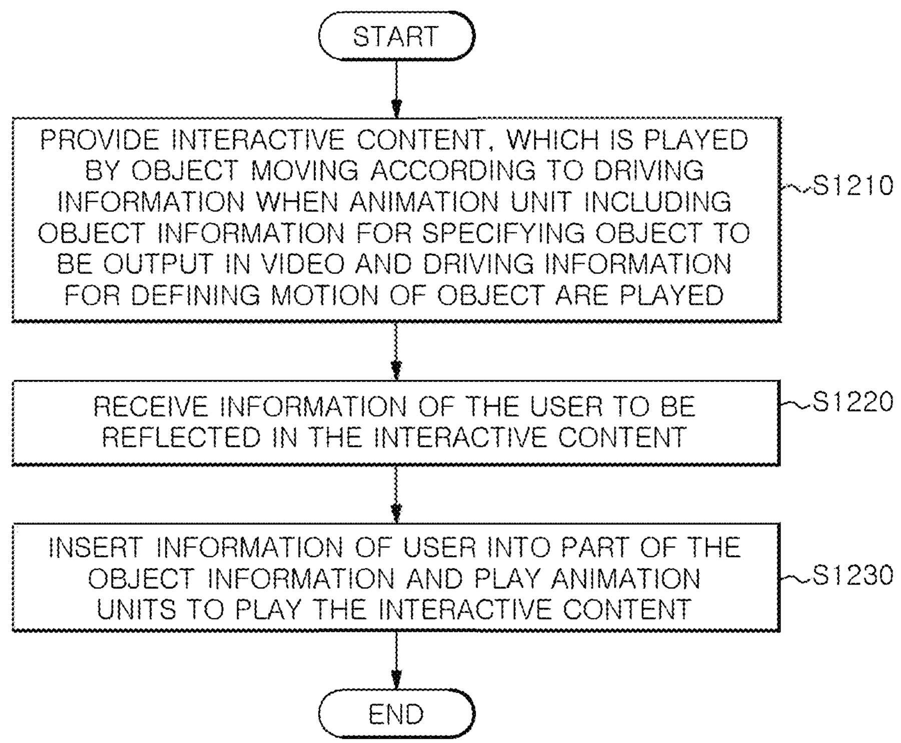
FIG. 12 is a flowchart of a method of providing interactive content according to an exemplary embodiment of the present disclosure.

FIG. 12 is a flowchart of a method of providing interactive content according to an exemplary embodiment of the present disclosure. Each operation of the method of providing interactive content according to FIG. 12 may be performed by the apparatus 100 for providing interactive content illustrated in FIG. 1, and each operation is performed as follows.

The apparatus 100 may provide interactive content, which is played by an object moving according to driving information when a plurality of animation units including object information for specifying the object to be output in a video and the driving information for defining motion of the object are replayed, to a user (S1210).

The apparatus 100 may receive information of the user to be reflected in the interactive content (S1220).

The apparatus 100 may insert the information of the user into a part of the object information and replay at least one of the plurality of animation units to play the interactive content (S1230).

Meanwhile, a process for performing each of the above-described operations has been described above with reference to FIGS. 1 to 11, and description thereof is omitted.

Interactive content according to the exemplary embodiment of the present disclosure is created in units of animations including object information, which specifies objects to be output in a video, and driving information, which defines motion of the objects. Accordingly, it is possible to reflect not only information on a process in which a user plays interactive content but also individuality of the user, such as the user's face, voice, and play characteristics, in various elements of the content while the interactive content proceeds.

Accordingly, a user can select a story flow and also generate unique content containing individuality of the user so that the user or the user's family member can become a character of content and play the content.

Also, a user can generate and have or share new content, which is replayed so that the face, voice, etc. of a character in interactive content may reflect the face and voice of the user or the user's friend or family member.

In addition, various effects which are directly or indirectly understood through the present disclosure may be provided.

The above-described embodiments of the present disclosure may be implemented with various means. For example, the embodiments of the present disclosure may be implemented in hardware, firmware, software, combinations thereof, or the like.

In the case of implementation by hardware, the method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, the method according to the embodiments of the present disclosure may be implemented in the form of a module, procedure, or function for performing the above-described functions or operations. A computer program recorded with software code or the like may be stored in a computer-readable recording medium or a memory unit and driven by a processor. The memory unit is located inside or outside the processor and may exchange data with the processor in various well-known ways.

Combinations of the individual blocks of the block diagram and flowchart attached to the present disclosure may also be performed by computer program instructions. These computer program instructions may be embedded in an encoding processor of a general-purpose computer, a special-purpose computer, or other programmable data processing apparatus so that the instructions performed through the encoding processor of a computer or other programmable data processing apparatus generate units for performing the functions described in each block of the block diagram or each operation of the flowchart. These computer program instructions may also be stored in a computer-usable or computer-readable memory capable of aiming for a computer or other programmable data processing equipment to implement the functionality in a particular manner. Accordingly, the instructions stored in the computer-usable or computer-readable memory may produce a manufacturing item containing instructions for performing functions described in each block of the block diagram or each operation of the flowchart. The computer program instructions may also be stored on a computer or other programmable data processing equipment. Accordingly, instructions, which are executed by a computer or other programmable data processing equipment to perform a series of operations on the computer or the programmable data processing equipment and generate a process performed by the computer, may also provide operations for performing functions described in each block of the block diagram or each operation of the flowchart.

In addition, each block or each operation may represent a part of a module, segment, or code that includes one or more executable instructions for executing a specified logical function. It is to be noted that in some alternative embodiments, functions mentioned in blocks or operations may occur output order. For example, two blocks or operations shown consecutively may be performed substantially concurrently in practice, or the blocks or operations may sometimes be performed in reverse order according to the corresponding function.

As such, those of ordinary skill in the art will appreciate that the present disclosure may be embodied in other specific forms without departing from the spirit or essential characteristics thereof. Therefore, the above-described embodiments are to be construed as illustrative and not restrictive in all aspects. The scope of the present disclosure is defined by the following claims rather than the detailed description, and it is understood that the present disclosure covers all modifications and alterations derived from the meaning and scope of the claims and their equivalents.

What is claimed is:

1. A method for providing interactive content to be performed with an interactive content providing apparatus, the method comprising:

when a plurality of animation units including object information for specifying an object to be output in a video and driving information for defining motion of the object are played, providing interactive content played by the object moving according to the driving information to a user;

receiving information of the user to be reflected in the interactive content;

when the information of the user includes a facial image of the user, normalizing the facial image and replacing object information corresponding to a face of a character in the object information with a normalized facial image; and playing at least one of the plurality of animation units to play the interactive content, wherein the normalizing the facial image and replacing object information corresponding to a face of the character further comprises, when the information of the user includes the facial image of the user, analyzing the facial image on the basis of a certain artificial intelligence algorithm to extract first tag information representing attributes of the facial image; and comparing second tag information, which is mapped to object information corresponding to faces of characters, with the first tag information and inserting the facial image to a character having the largest number of pieces of second tag information corresponding to the first tag information, wherein the second tag information is mapped to the object information corresponding to the face of the character and stored in advance or extracted from an image of the character on the basis of a certain artificial intelligence algorithm.

2. The method of claim 1, wherein the plurality of animation units are played in a preset sequence according to an animation method or played according to a diverging animation method of playing a subsequent animation unit determined on the basis of a first input of the user regarding a plurality of selection options for receiving selection of any one of the plurality of animation units or a second input of the user regarding object information which is output while a certain animation unit is played, further comprising:

when an animation unit is played according to the diverging animation method, sensing the first input regarding the plurality of selection options or the second input regarding object information which is output while the animation unit is played; and playing an animation unit corresponding to the first input or the second input.

3. The method of claim 2, further comprising:

storing an input of the user while the interactive content is played; and when the play is finished, generating second content in which animation units are replayed in a sequence corresponding to the input according to the information of the user.

4. The method of claim 1, wherein separately from the plurality of animation units, the interactive content further includes object reaction animation information for defining motion made by the object when an input for the object is sensed while the interactive content is played.

5. The method of claim 1, further comprising:

specifying information on an event type, an input time, and an input value regarding the received information of the user and generating play information to which the specified information is mapped; and generating second content in which the interactive content is replayed according to the information on the event type, the input time, and the input information included in the play information.

6. The method of claim 1, further comprising providing the object information and the driving information constituting the animation units to the user and receiving editing information of the user regarding the object information, the driving information, or a replay sequence of the animation units, wherein playing the interactive content including information on the animation units reflecting the received editing information.

7. The method of claim 1, wherein the animation units further include voice information to be output in the video and subtitle information to be output according to the voice information in the video, and the voice information includes a voice file having a replay time of a preset time or less, further comprising, when the voice information is replayed in the video, outputting the subtitle information corresponding to the voice information in the video during the replay time.

8. The method of claim 7, further comprising:

when an input for the subtitle output in the video is sensed, receiving a voice of the user corresponding to the subtitle information;

inserting the voice of the user to the voice information corresponding to the subtitle information; and when the play is finished, generating second content in which the animation units are replayed to output the voice information to which the voice of the user is inserted according to the subtitle information.

9. The method of claim 8, wherein the receiving of the voice of the user corresponding to the subtitle information comprises:

outputting a first button for searching for a subtitle which is output before the subtitle information and a second button for searching for a subtitle which is output after the subtitle information;

outputting the previous subtitle or the subsequent subtitle on the basis of an input of the user for the first button or the second button; and receiving a voice of the user corresponding to subtitle information which is output on the basis of the input of the user for the first button or the second button.

10. The method of claim 9, wherein the receiving of the voice of the user corresponding to the subtitle information further comprises imposing a charge on the user when the voice of the user is received for a preset time or more.

11. The method of claim 1, wherein the replacing of the object information comprises:

when a facial image is input by the user, normalizing the facial image to show a certain angle, shape, or expression using a certain artificial intelligence model which is trained to output an image obtained by modifying a facial image to show a certain angle, shape, or expression;

specifying feature points of the normalized facial image as vertices;

generating a three-dimensional model having a mesh structure obtained by connecting the vertices together; and replacing the object information corresponding to the face of the character in the object information with the three-dimensional model.

12. The method of claim 11, wherein the playing of the interactive content comprises implementing motion or an expression by moving the vertices included in the three-dimensional model according to the driving information.

13. The method of claim 12, wherein the implementing of the motion or the expression comprises:

specifying a first vertex at which motion will be started and a second vertex at which the motion will be finished among the vertices included in the three-dimensional model; and controlling the first vertex to move toward the second vertex to implement motion or an expression by moving the vertices included in the three-dimensional model according to the driving information.

14. The method of claim 12, wherein the implementing of the motion or the expression comprises:

specifying a first vertex at which motion will be started and a second vertex at which the motion will be finished among the vertices included in the three-dimensional model where the first vertex includes a plurality of vertices connected to one or more different vertices, and the second vertex includes as many vertices as the plurality of vertices;

determining faces that each connect the plurality of first vertices to the plurality of second vertices that are each specified as end positions of motion of the plurality of first vertices at the shortest distance among faces included in the three-dimensional model;

specifying n (n is a natural number greater than or equal to one) positions along certain lines extending from the first vertices to the second vertices on the basis of the faces; and controlling the first vertices to move toward the second vertices via the n positions to implement the motion.

15. The method of claim 1, wherein the replacing of the object information corresponding to the face of the character in the object information with the normalized facial image comprises imposing a charge on the user when a facial image is inserted to a character in addition to a basic character in the object information.

16. The method of claim 1, further comprising:

when the information of the user includes the facial image of the user, adjusting a tone of the facial image; and applying a face filter to modify the facial image according to certain rules.

17. The method of claim 1, further comprising, when the information of the user includes the facial image of the user and the facial image deviates from a standard of facial information predetermined on the basis of a certain artificial intelligence algorithm, requesting an input of another facial image.

18. The method of claim 1, further comprising outputting the object information according to coordinate information corresponding to a standard selected by the user on the basis of coordinate information for presetting locations at which the object information is output depending on different standards.

19. The method of claim 1, further comprising:

receiving a surrounding video obtained by imaging surroundings with a camera part of the interactive content providing apparatus; and disposing the object information on a layer of the surrounding video on the basis of coordinate information for presetting locations at which the object information is output in a display part of the interactive content providing apparatus and outputting the object information on the display part or disposing the object information on the layer of the surrounding video on the basis of a function designed to map the object information to one position in the surrounding video and outputting the object information on the display part.

20. The method of claim 1, further comprising:

inputting first object information to an artificial intelligence model, which is trained to determine a class of input object information and map driving information corresponding to the class to the input object information, and mapping first driving information determined by the artificial intelligence model to the first object information; and when the user's input for an object corresponding to the first object information is sensed, executing the first driving information.

21. The method of claim 1, wherein the object information further includes information on a user model which reflects a character's face or the user's face and a second object which is represented together with the user model on the basis of relative distance from the user model, and the playing of the interactive content comprises setting, when the user model moves according to the driving information, distance between one or more vertices included in the user model and the second object to be constant to play the interactive content.

22. An apparatus for providing interactive content, the apparatus comprising:

an input interface configured to sense an input of a user;

a display part configured to output a video;

at least one memory configured to store instructions for performing a certain operation; and at least one processor operably connected to the at least one memory and configured to execute the instructions, wherein the at least one processor provides, when a plurality of animation units including object information for specifying an object to be output in the video and driving information for defining motion of the object are played, interactive content played by the object moving according to the driving information to the user, receives information of the user to be reflected in the interactive content, and when the information of the user includes a facial image of the user, normalizes the facial image and replaces object information corresponding to a face of a character in the object information with a normalized facial image, and plays at least one of the plurality of animation units to play the interactive content, wherein the at least one processor is further configured to:

when the information of the user includes the facial image of the user, analyze the facial image on the basis of a certain artificial intelligence algorithm to extract first tag information representing attributes of the facial image; and compare second tag information, which is mapped to object information corresponding to faces of characters, with the first tag information and insert the facial image to a character having the largest number of pieces of second tag information corresponding to the first tag information, wherein the second tag information is mapped to the object information corresponding to the face of the character and stored in advance or extracted from an image of the character on the basis of a certain artificial intelligence algorithm.

23. A non-transitory computer-readable recording medium in which a computer program including instructions for causing a processor to perform the method of claim 1 is recorded.

* * * * *